United States Patent
Momose

(10) Patent No.: US 11,386,277 B2
(45) Date of Patent: Jul. 12, 2022

(54) MAGNETIC RECORDING MEDIUM PROCESSING APPARATUS AND MAGNETIC FIELD GENERATION METHOD

(71) Applicant: NIDEC SANKYO CORPORATION, Nagano (JP)

(72) Inventor: Munemasa Momose, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 17/254,631

(22) PCT Filed: Jun. 6, 2019

(86) PCT No.: PCT/JP2019/022532
§ 371 (c)(1),
(2) Date: Dec. 21, 2020

(87) PCT Pub. No.: WO2019/244655
PCT Pub. Date: Dec. 26, 2019

(65) Prior Publication Data
US 2021/0150157 A1    May 20, 2021

(30) Foreign Application Priority Data
Jun. 21, 2018    (JP) .............................. JP2018-117898

(51) Int. Cl.
*G06K 7/08* (2006.01)
*G06K 13/06* (2006.01)

(52) U.S. Cl.
CPC ............. *G06K 7/087* (2013.01); *G06K 13/06* (2013.01)

(58) Field of Classification Search
CPC .... G07F 19/2055; G06K 7/082; G06K 7/087; G06K 7/084; G06K 13/08; G06K 13/06
See application file for complete search history.

(56) References Cited

U.S. PATENT DOCUMENTS

| | | | |
|---|---|---|---|
| 2011/0135092 A1* | 6/2011 | Lehner | G07F 19/2055 380/252 |
| 2016/0232385 A1* | 8/2016 | Takeda | G07F 19/2055 |
| 2017/0140180 A1* | 5/2017 | Hoson | G06K 7/087 |

FOREIGN PATENT DOCUMENTS

| | | |
|---|---|---|
| JP | 2015045934 A | 3/2015 |
| JP | 2015197687 A | 11/2015 |
| JP | 2016206780 A | 12/2016 |

OTHER PUBLICATIONS

Akihiro et al. (JP2016206780(A), machine English translation, 10 pages (Year: 2021).*

(Continued)

*Primary Examiner* — Tuyen K Vo
(74) *Attorney, Agent, or Firm* — Cantor Colburn LLP

(57) ABSTRACT

A magnetic recording medium processing apparatus may include a coil structured to generate a magnetic field, a magnetic field generation control part which controls generation of the magnetic field in the coil, a sensor structured to execute acquisition of predetermined information, and a sensor control part which controls execution of the acquisition of the information in the sensor. The sensor control part may request the magnetic field generation control part to stop magnetic field generation from the coil at a timing earlier by a predetermined time period than a start timing when the sensor starts the acquisition of the information, and the magnetic field generation control part may stop the generation of the magnetic field from the coil when stop of the magnetic field generation is requested by the sensor control part.

18 Claims, 10 Drawing Sheets

(56) References Cited

OTHER PUBLICATIONS

International Search Report for International Application No. PCT/JP2019/022532; dated Jul. 30, 2019.

* cited by examiner

MAGNETIC RECORDING MEDIUM PROCESSING APPARATUS AND MAGNETIC FIELD GENERATION METHOD

CROSS REFERENCE TO RELATED APPLICATION

This application is a national stage application of PCT/JP2019/022532 filed on Jun. 6, 2019, which claims priority under 35 U.S.C. § 119 to Japanese Application No. 2018-117898 filed on Jun. 21, 2018, the entire content of which is incorporated herein by reference.

TECHNICAL FIELD

The present invention relates to a magnetic recording medium processing apparatus and a magnetic field generation method.

BACKGROUND ART

In recent years, a crime called skimming has been increasing which swindles information recorded in a magnetic card such as a bank card. As a countermeasure to the skimming, a technique has been introduced in which a disturbing magnetic field is generated in a card insertion port of a card reader. In such a technique, the disturbing magnetic field being generated may affect detecting functions of various sensors to occur a situation that correct detection cannot be performed. Therefore, a technique has been considered that a sensor is operated at a timing when a disturbing magnetic field is not generated (for example, see Patent Literature 1).

CITATION LIST

Patent Literature

[PTL 1] Japanese Patent Laid-Open No. 2016-206780

SUMMARY OF THE INVENTION

Problems to be Solved by the Invention

When a sensor is operated based on a timing which controls generation of a disturbing magnetic field, there is a problem that a sensor is unable to detect at a timing which is originally required.

In view of the problem described above, the present invention provides a magnetic recording medium processing apparatus and a magnetic field generation method in which a sensor is capable of detecting at a necessary timing while maintaining security.

Means to Solve the Problems

To solve the above-mentioned problem, at least an embodiment of the present invention may provide a magnetic recording medium processing apparatus including a magnetic field generation part structured to generate a magnetic field, a magnetic field generation control part configured to control generation of the magnetic field in the magnetic field generation part, a sensor configured to execute acquisition of predetermined information, and a sensor control part configured to control execution of the acquisition of the information in the sensor. The sensor control part may request stop of magnetic field generation from the magnetic field generation part to the magnetic field generation control part at a timing earlier by a predetermined time period than a start timing when the sensor starts the acquisition of the information, and the magnetic field generation control part may stop the generation of the magnetic field from the magnetic field generation part when the stop of the magnetic field generation is requested from the sensor control part.

In the magnetic recording medium processing apparatus in accordance with at least an embodiment of the present invention, the sensor control part may request a stop of the disturbing magnetic field generation from the magnetic field generation part to the magnetic field generation control part before the sensor starts acquisition of the information, and the magnetic field generation control part may stop the generation of the disturbing magnetic field from the magnetic field generation part according to the request. Therefore, according to at least an embodiment of the present invention, the sensor is capable of performing detection at a necessary timing while maintaining security.

In the magnetic recording medium processing apparatus in accordance with at least an embodiment of the present invention, the magnetic field generation control part may output a predetermined stop notification to the sensor control part after the magnetic field generation control part stops the generation of the magnetic field from the magnetic field generation part, and the sensor control part may cause the sensor to start the acquisition of the information when the stop notification is outputted from the magnetic field generation control part. In this case, the sensor control part may start acquisition of the information in the sensor in a state that the generation of the disturbing magnetic field is stopped and thus, the sensor is capable of acquiring the information without being affected by the disturbing magnetic field and the security is further easily maintained.

In the magnetic recording medium processing apparatus in accordance with at least an embodiment of the present invention, the sensor control part may output a predetermined finished notification to the magnetic field generation control part when the sensor finishes the acquisition of the information, and the magnetic field generation control part may resume the generation of the magnetic field from the magnetic field generation part when the finished notification is outputted from the sensor control part. In this case, when the acquisition of the information in the sensor is finished, the generation of the magnetic field may be resumed and thus, the security is further easily maintained.

In at least an embodiment of the present invention, the magnetic recording medium processing apparatus may include a plurality of the sensors and a plurality of the sensor control parts each of which controls execution of the acquisition of the information in each of the plurality of the sensors, a sensor control part other than a first sensor control part in the plurality of the sensor control parts may output a confirmation request confirming a schedule which is scheduled to request the stop to the first sensor control part at the timing earlier by the predetermined time period than the start timing when the sensor controlled by the sensor control part starts the acquisition of the information and, in a case that the confirmation request is outputted from the sensor control part other than the first sensor control part, the first sensor control part may output a schedule-presence notification to the sensor control part other than the first sensor control part when there is the schedule requesting the magnetic field generation control part to stop the magnetic field generation from the magnetic field generation part, and the sensor control part which has outputted the confirmation request may be configured so that, in a case that the schedule-presence notification indicating the schedule requesting the stop is outputted from the first sensor control part, the sensor control part may cause the sensor to start the acquisition of the information after the stop notification is outputted from the magnetic field generation control part. In this case, each sensor requiring acquisition of information may acquire the information during a stop period of the disturbing magnetic field generation due to a stop request from one of a plurality of the sensors and thus, frequency of a time period when the disturbing magnetic field generation is stopped is restrained and the security is further easily maintained.

In the magnetic recording medium processing apparatus in accordance with at least an embodiment of the present invention, the first sensor control part may be configured so that, in a case that the confirmation request is outputted from the sensor control part other than the first sensor control part, when there is no schedule requesting the magnetic field generation control part to stop the magnetic field generation from the magnetic field generation part, the first sensor control part may output a schedule-absence notification indicating that there is no schedule requesting to stop the magnetic field generation to the sensor control part other than the first sensor control part, and the sensor control part which has outputted the confirmation request may be configured so that, after the confirmation request has been outputted, in a case that the schedule-absence notification is outputted from the first sensor control part, the sensor control part may request the magnetic field generation control part to stop the magnetic field generation from the magnetic field generation part. In this case, even in a case that a plurality of the sensors which are affected by the disturbing magnetic field is arranged, the generation of the disturbing magnetic field may be stopped at a timing only when acquisition of the information is required and thus, the security is further easily maintained.

In the magnetic recording medium processing apparatus in accordance with at least an embodiment of the present invention, each of the plurality of the sensor control parts may output a predetermined finished notification to the magnetic field generation control part when each of the plurality of the sensors finishes the acquisition of the information, and the magnetic field generation control part may resume the generation of the magnetic field from the magnetic field generation part after the latest finished notification is outputted among the finished notifications outputted from the plurality of the sensor control parts. In this case, frequency of a time period when the disturbing magnetic field generation is stopped is restrained and the security is further easily maintained.

In at least an embodiment of the present invention, the magnetic recording medium processing apparatus may include a medium sensor structured to detect that a medium on which information is recorded by using magnetism has been inserted into the magnetic recording medium processing apparatus and, in a case that the medium sensor detects that the medium has been inserted, the magnetic field generation control part may intermittently generate the magnetic field from the magnetic field generation part and, when the generation of the magnetic field from the magnetic field generation part is stopped, the stop notification may be outputted to the plurality of the sensor control parts. In this case, the sensor which is required to acquire medium information may acquire the information in a time period when generation of the disturbing magnetic field is stopped and thus, the medium information can be acquired while security is maintained.

In the magnetic recording medium processing apparatus in accordance with at least an embodiment of the present invention, the magnetic field generation control part may be configured so that, when a designated stop time period is finished, the magnetic field generation control part may output a resumption notification indicating that the designated stop time period is finished to the sensor control part to resume the generation of the magnetic field from the magnetic field generation part. In this case, each sensor may be capable of acquiring information by effectively utilizing a time period when generation of the disturbing magnetic field is stopped and the respective sensors are capable of acquiring information collectively and thus, security is easily maintained.

To solve the above-mentioned problem, at least an embodiment of the present invention may provide a magnetic field generation method including processing which generates a magnetic field from a coil, processing in which a sensor control part controlling a sensor requests a magnetic field generation control part which controls magnetic field generation of the coil to stop the magnetic field generation from the coil at a timing earlier by a predetermined time period than a start timing when the sensor starts acquisition of the information, and processing in which the magnetic field generation control part stops generation of the magnetic field from the coil when stop of the magnetic field generation is requested.

In the magnetic field generation method in accordance with at least an embodiment of the present invention, before a sensor starts acquisition of information, the sensor control part may request the magnetic field generation control part to stop generation of a disturbing magnetic field from the coil, and the magnetic field generation control part may stop the generation of the disturbing magnetic field from the coil according to the request. Therefore, according to at least an embodiment of the present invention, the sensor is capable of performing detection at a necessary timing while maintaining security.

In at least an embodiment of the present invention, the magnetic field generation method may further include processing in which a predetermined stop notification is outputted to the sensor control part when the magnetic field generation control part stops the generation of the magnetic field from the coil, and processing in which the sensor control part causes the sensor to start the acquisition of the information when the stop notification is outputted. In this case, the sensor control part may start acquisition of the information in the sensor in a state that the generation of the disturbing magnetic field is stopped and thus, the sensor is capable of acquiring the information without being affected by the disturbing magnetic field and the security is further easily maintained.

In at least an embodiment of the present invention, the magnetic field generation method further may include processing in which, when the sensor finishes the acquisition of the information, the sensor control part outputs a predetermined finished notification to the magnetic field generation control part, and processing in which, when the finished notification is outputted, the magnetic field generation control part resumes the generation of the magnetic field from the coil. In this case, when the acquisition of the information in the sensor is finished, the generation of the magnetic field may be resumed and thus, the security is further easily maintained.

Effects of the Invention

As described above, in the present invention, the sensor is capable of performing detection at a necessary timing while maintaining security.

DESCRIPTION OF EMBODIMENTS

Embodiments of the present invention will be described below with reference to the accompanying drawings.
(Mounting Example of Magnetic Field Generation Device)

Figure 1:
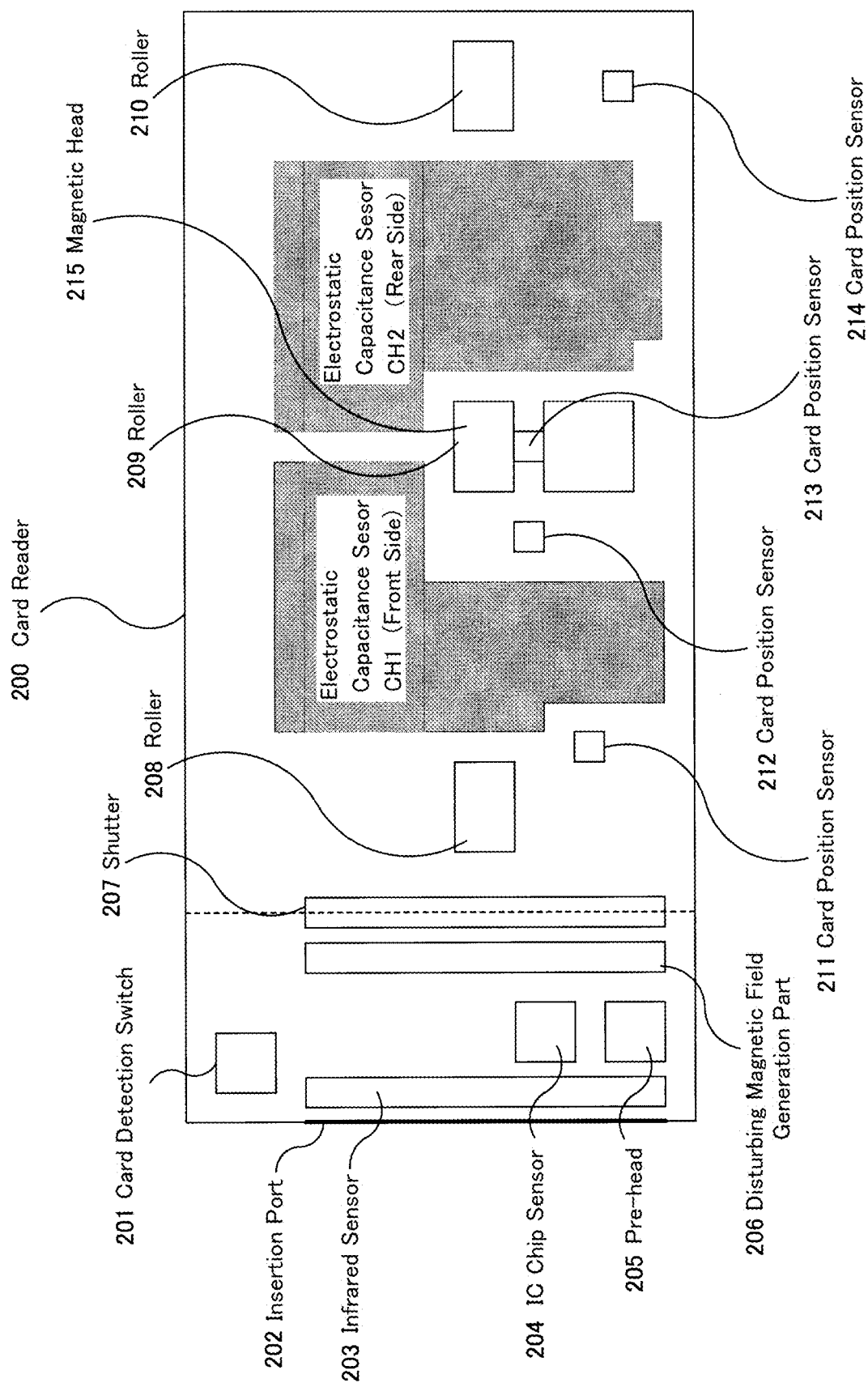
FIG. 1 is a view showing a structural example of a card reader on which a magnetic field generation device in accordance with the present invention is mounted.

FIG. 1 is a view showing a structural example of a card reader on which a magnetic field generation device in accordance with the present invention is mounted. In this example, a card reader is a magnetic recording medium processing apparatus which is structured to read information from a magnetic card on which predetermined information is written (recorded) by using a magnetic method and perform predetermined processing. As shown in FIG. 1, a card reader 200 includes a card detection switch 201, an insertion port 202, an infrared sensor 203, an IC chip sensor 204, a pre-head 205, a disturbing magnetic field generation part 206, a shutter 207, rollers 208 through 210, card position sensors 211 through 214, and a magnetic head 215. The card detection switch 201 is a medium sensor which is described in a third embodiment described below and is a switch which is turned "ON" when a magnetic card is inserted into the insertion port 202 and is turned "OFF" when the magnetic card is taken into an inside of the card reader 200. The disturbing magnetic field generation part 206 may be a coil which is described in first through third embodiments described below. The rollers 208 through 210 convey a magnetic card inserted from the insertion port 202. The card position sensors 211 through 214 are sensors which detect a position of the magnetic card.

First Embodiment

Figure 2:
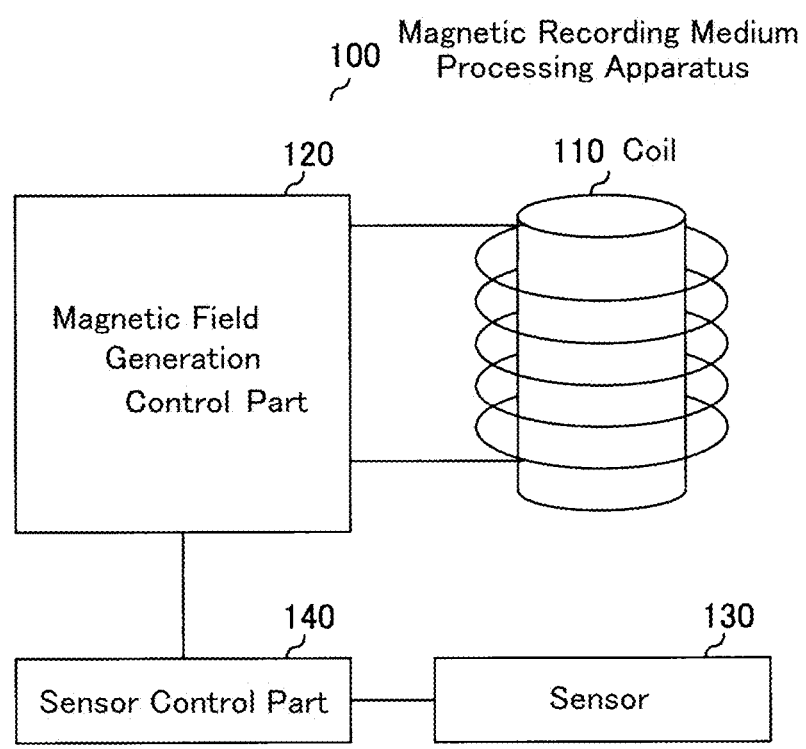
FIG. 2 is a view showing a magnetic recording medium processing apparatus in accordance with a first embodiment of the present invention.

FIG. 2 is a view showing a magnetic recording medium processing apparatus (magnetic field generation device) in accordance with a first embodiment of the present invention. The magnetic recording medium processing apparatus 100 in this embodiment includes, as shown in FIG. 2, a coil 110, a magnetic field generation control part 120, a sensor 130 and a sensor control part 140. The magnetic recording medium processing apparatus 100 is, for example, a device such as a magnetic card reader which is structured so that, when a medium on which information is recorded by using magnetism (hereinafter, referred to as a magnetic card) is inserted, information recorded in the magnetic card is read to perform predetermined processing. FIG. 2 shows an example of principal structure elements relating to this embodiment among structure elements included in the magnetic recording medium processing apparatus 100 in this embodiment.

The coil 110 is a magnetic field generation part to which a voltage is applied and thereby an electric current flows to generate a magnetic field. The coil 110 is provided at a position where magnetic noise (disturbing magnetic field) can be applied to a skimming head, for example, in the vicinity of the insertion port for a magnetic card.

The magnetic field generation control part 120 controls generation of a magnetic field in the coil 110. Specifically, the magnetic field generation control part 120 causes to generate a magnetic field by supplying a current or applying a voltage to the coil 110. The magnetic field generation control part 120 stops generation of the magnetic field from the coil 110 when stop of the magnetic field generation is requested by the sensor control part 140. When the magnetic field generation control part 120 stops the generation of the magnetic field from the coil 110, the magnetic field generation control part 120 outputs a predetermined stop notification to the sensor control part 140. When the magnetic field generation control part 120 receives a finished notification outputted from the sensor control part 140, the magnetic field generation control part 120 resumes generation of the magnetic field from the coil 110.

The sensor 130 executes acquisition or detection of predetermined information. The sensor 130 is, for example, an infrared sensor, an IC (Integrated Circuit) chip sensor, or a pre-head.

The sensor control part 140 controls execution of acquisition of information in the sensor 130. The sensor control part 140 requests the magnetic field generation control part 120 to stop the magnetic field generation from the coil 110 at a timing earlier by a predetermined time period than a start timing when the sensor 130 starts acquisition of information. When the stop notification is outputted from the magnetic field generation control part 120, the sensor control part 140 starts acquisition of information by the sensor 130 and performs determination processing based on the information acquired by the sensor 130.

Figure 3:
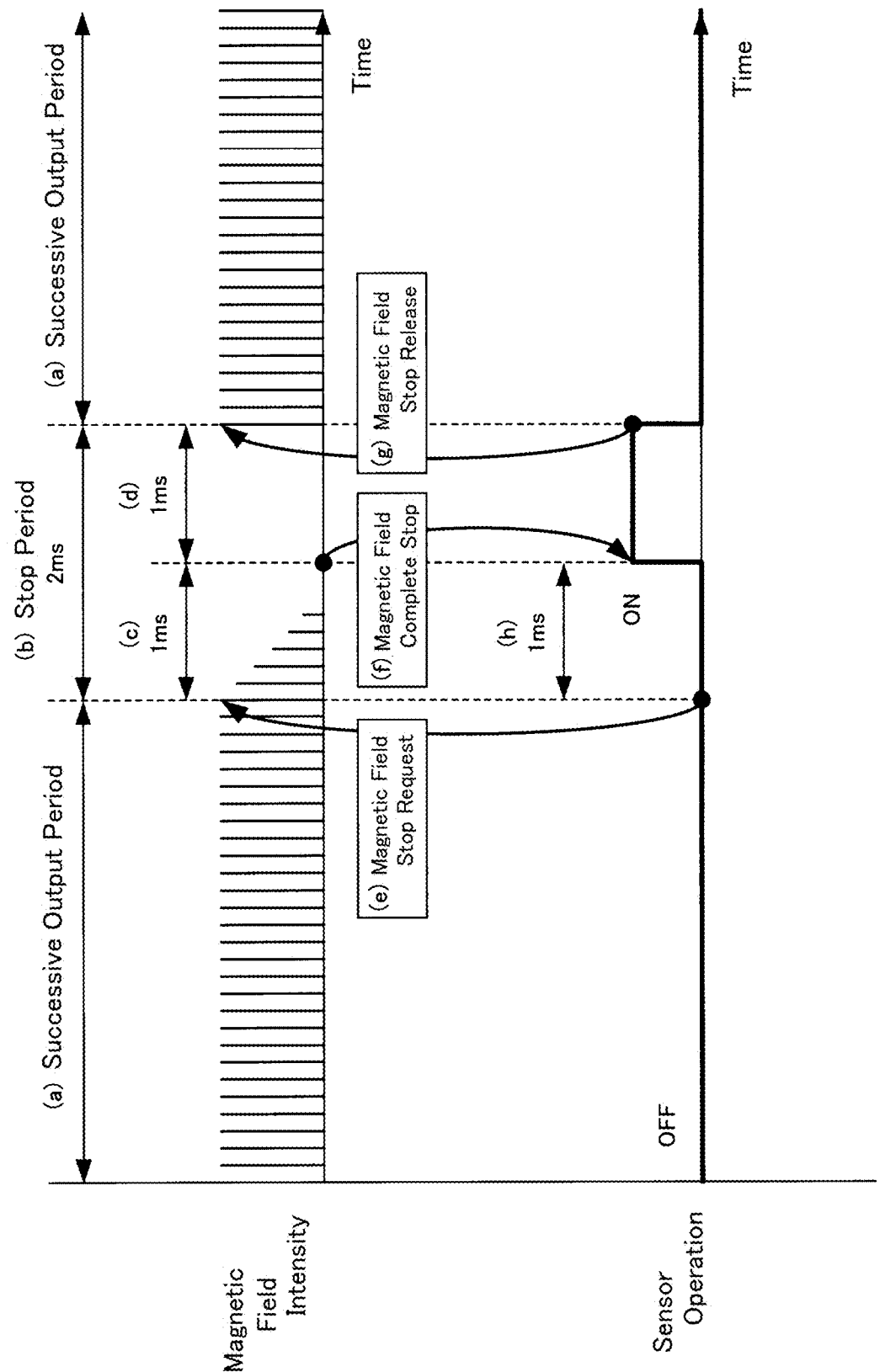
FIG. 3 is a view showing an example of a timing relationship between magnetic field generation and a sensor operation in the magnetic recording medium processing apparatus shown in FIG. 2.

FIG. 3 is a view showing an example of a timing relationship between magnetic field generation and a sensor operation in the magnetic recording medium processing apparatus 100 shown in FIG. 2.

First, the magnetic field generation control part 120 successively generates a disturbing magnetic field from the coil 110 ("a"). The sensor control part 140 requests the magnetic field generation control part 120 to stop magnetic field (disturbing magnetic field) generation from the coil 110 (magnetic field stop request) at a timing earlier by a predetermined time period ("h": for example, 1 ms) than a start timing when the sensor 130 starts acquisition of information ("e"). As a result, the magnetic field generation control part 120 stops the generation of the magnetic field from the coil 110. When the generation of the magnetic field from the coil 110 is completely stopped ("c" from the timing of "e", for example, "1 ms" elapses), the magnetic field generation control part 120 outputs a stop notification (magnetic field complete stop notification) to the sensor control part 140 ("f"). In this embodiment, a time period of "h" is not less than the time period of "c".

Then, the sensor control part 140 causes the sensor 130 to execute acquisition of information. After that, when the sensor 130 finishes the acquisition of the information, the sensor control part 140 outputs a finished notification to the magnetic field generation control part 120 ("g"). This finished notification is permission or a request of stop release of the magnetic field. The magnetic field generation control part 120 stops the generation of the magnetic field from the coil 110 during a time period from the time when the stop notification is outputted to the time when the finished notification is received ("d": for example, 1 ms). In other words, the "b" shown in FIG. 3: for example, a time period of 2 ms is a stop period of the magnetic field generation from the coil 110.

Therefore, the magnetic field generation control part 120 resumes generation of the disturbing magnetic field from the coil 110 to successively generate the disturbing magnetic field ("a").

In accordance with an embodiment of the present invention, it may be configured that such operation is performed in a case that a card detection switch described below is detecting a magnetic card.

Figure 4:
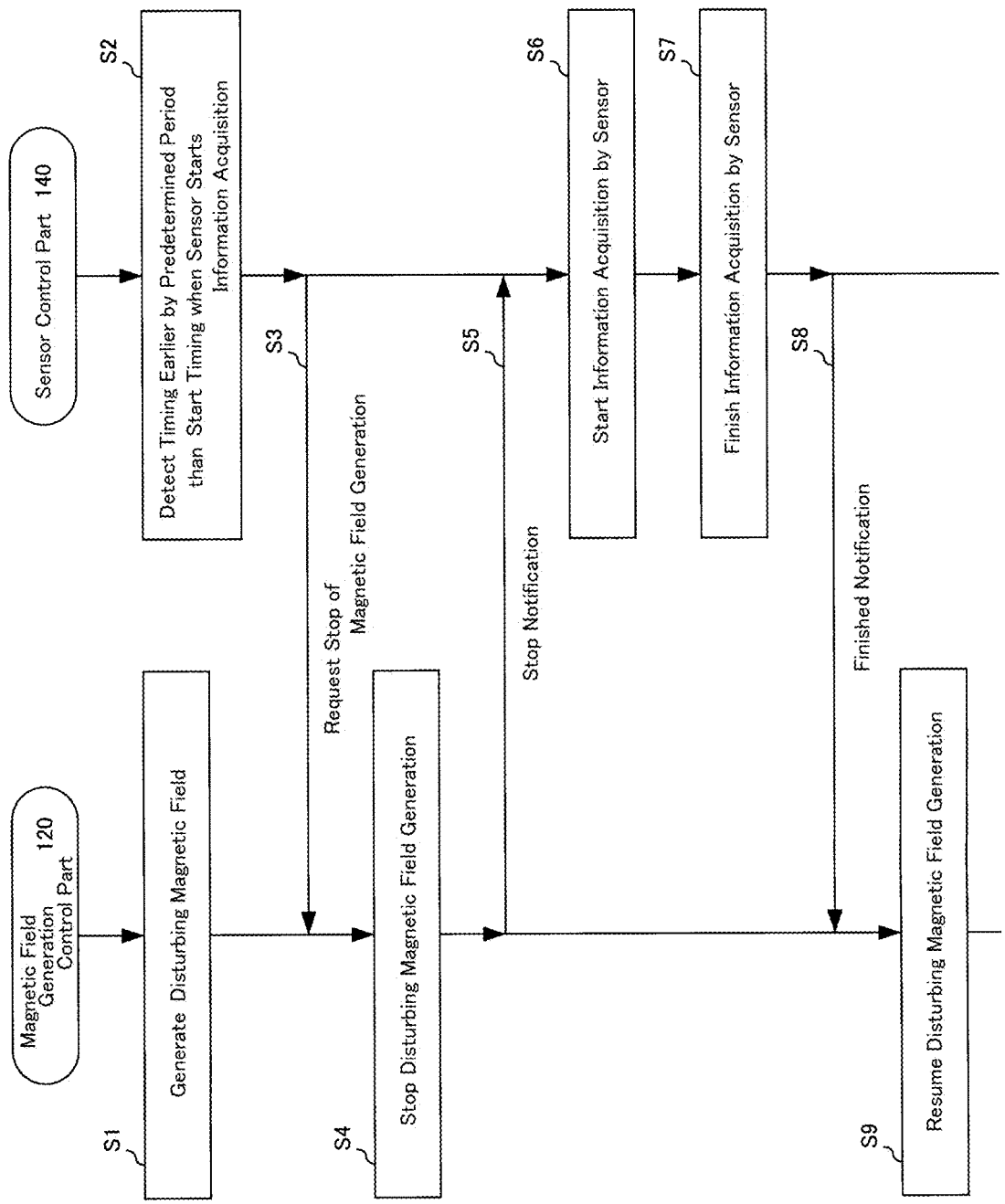
FIG. 4 is a sequence diagram for explaining an example of a magnetic field generation method in the magnetic recording medium processing apparatus shown in FIG. 2.

Next, a magnetic field generation method in the magnetic recording medium processing apparatus 100 shown in FIG. 2 will be described below. FIG. 4 is a sequence diagram for explaining an example of a magnetic field generation method in the magnetic recording medium processing apparatus 100 shown in FIG. 2.

First, the magnetic field generation control part 120 generates a disturbing magnetic field from the coil 110 (step S1). On the other hand, when the sensor control part 140 detects a timing earlier by a predetermined time period than a start timing when the sensor 130 starts acquisition of information (step S2), the sensor control part 140 requests the magnetic field generation control part 120 to stop generation of the magnetic field (disturbing magnetic field) from the coil 110 (step S3). In this embodiment, the timing when the sensor 130 starts acquisition of information is set in advance. The timing may be, for example, periodic timing such as a sampling period, timing when a predetermined time period has elapsed after occurrence of some event (an event is detected), or timing determined depending on a demand of a user or a function.

As a result, the magnetic field generation control part 120 stops generation of the disturbing magnetic field from the coil 110 (step S4). When the generation of the disturbing magnetic field from the coil 110 is completely stopped, the magnetic field generation control part 120 outputs a stop notification to the sensor control part 140 (step S5).

After that, when a start timing that the sensor 130 starts to acquire information is reached, the sensor control part 140 starts the sensor 130 to acquire information (step S6). The start of the acquisition of the information by the sensor 130 may be executed by shifting a state that the result detected by the sensor 130 is made ineffective to a state that the result is made effective. When the sensor 130 finishes the acquisition of the information (step S7), the sensor control part 140 outputs a finished notification to the magnetic field generation control part 120 (step S8). The finished notification is permission or a request of the stop release of the magnetic field. As a result, the magnetic field generation control part 120 resumes generation of the disturbing magnetic field from the coil 110 (step S9). In accordance with an embodiment of the present invention, it may be configured that the magnetic field generation control part 120 receives a notification of a time period of acquisition of information in the sensor 130 from the sensor control part 140 and, when the time period (stop period) is finished, a resumption notification is outputted to the sensor control part 140 and generation of the disturbing magnetic field from the coil 110 is autonomously resumed.

The "stop notification", the "finished notification" and the "resumption notification" described above are sufficient that, in exchange between the magnetic field generation control part 120 and the sensor control part 140, the notification can be recognized as a notification that generation of the disturbing magnetic field from the coil 110 is completely stopped, as a notification that the sensor 130 has finished acquisition of information, and that the magnetic field generation control part 120 resumes generation of the disturbing magnetic field from the coil 110. The format, the protocols used in the notification and the like are not limited.

As described above, the sensor control part 140 requests the magnetic field generation control part 120 to stop the disturbing magnetic field generation from the coil 110 before the sensor 130 starts to acquire information. The magnetic field generation control part 120 stops the generation of the disturbing magnetic field from the coil 110 according to the request. The sensor control part 140 starts acquisition of information in the sensor 130 in a state that generation of the disturbing magnetic field is stopped. Therefore, the sensor is capable of performing detection at a necessary timing while maintaining security.

Second Embodiment

Figure 5:
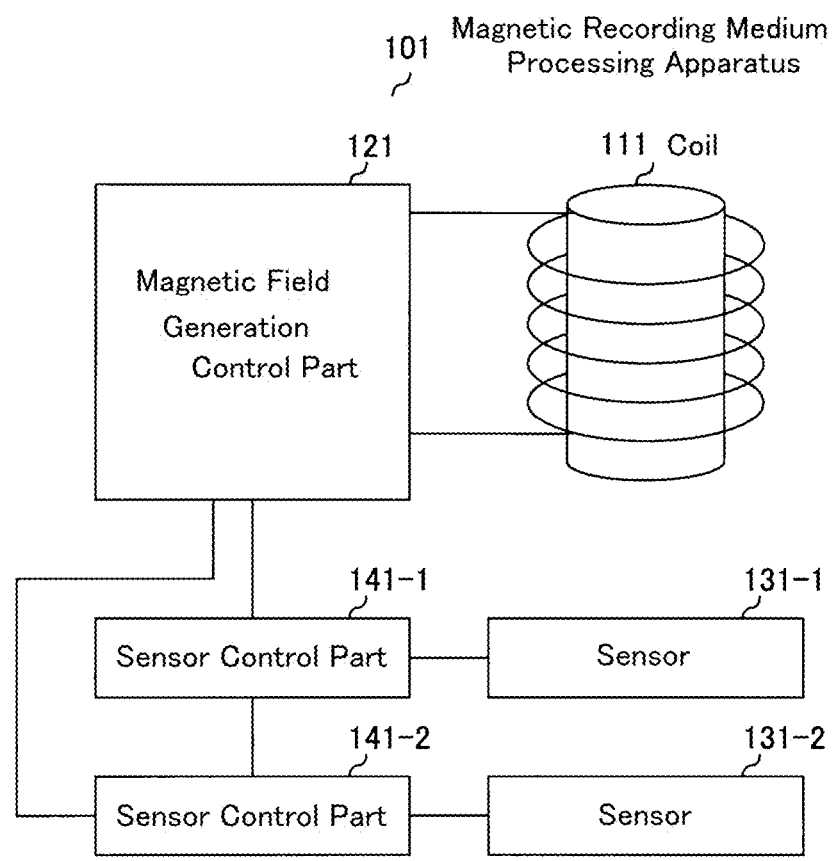
FIG. 5 is a view showing a magnetic recording medium processing apparatus in accordance with a second embodiment of the present invention.

In the first embodiment, a case in which one sensor is provided is described as an example, but the present invention may be applied to a case with a plurality of sensors. FIG. 5 is a view showing a magnetic recording medium processing apparatus (magnetic field generation device) in accordance with a second embodiment of the present invention. A magnetic recording medium processing apparatus 101 in this embodiment includes, as shown in FIG. 5, a coil 111, a magnetic field generation control part 121, sensors 131-1 and 131-2, and sensor control parts 141-1 and 141-2. The magnetic recording medium processing apparatus 101 is, for example, an apparatus such as a magnetic card reader, which is structured to read information recorded on a magnetic card when the magnetic card is inserted and perform predetermined processing. FIG. 5 shows an example of principal structure elements relating to this embodiment among structure elements included in the magnetic recording medium processing apparatus 101 in this embodiment.

The coil 111 is a magnetic field generation part to which a voltage is applied and thereby an electric current flows to generate a magnetic field. The coil 111 is provided at a position where magnetic noise can be applied to a skimming head, for example, in the vicinity of an insertion port for a magnetic card.

The sensors 131-1 and 131-2 execute acquisition or detection of predetermined information. The sensors 131-1 and 131-2 are, for example, an infrared sensor, an IC chip sensor or a pre-head.

The sensor control parts 141-1 and 141-2 correspond to the sensors 131-1 and 131-2 on a one-to-one basis and control execution of acquisition of information in the respective sensors 131-1 and 131-2. The sensor control part is configured so that, in a case that a schedule-presence notification is not outputted from other sensor control parts, the sensor control part outputs a confirmation request to a representative sensor control part among a plurality of sensor control parts at a timing earlier by a predetermined time period than a start timing when the sensor which is controlled by itself starts acquisition of information. The detail of the schedule-presence notification will be described below. The representative sensor control part is configured so that, in a case that a confirmation request is outputted from another sensor control part, when there is a schedule which is scheduled to request the magnetic field generation control part 121 to stop the magnetic field generation from the coil 111, the representative sensor control part outputs the schedule-presence notification to other sensor control parts and requests the magnetic field generation control part 121 to stop the magnetic field generation from the coil 111 at a timing earlier by a predetermined time period than a start timing when the sensor controlled by itself starts acquisition of information. In a case that a confirmation request is outputted from another sensor control part, when there is no schedule requesting the magnetic field generation control part 121 to stop the magnetic field generation from the coil 111, the representative sensor control part outputs a schedule-absence notification to other sensor control parts. In a case that a schedule-absence notification is outputted from the representative sensor control part, the sensor control part other than the representative sensor control part requests the magnetic field generation control part 121 to stop the magnetic field generation from the coil 111 at a timing earlier by a predetermined time period than a start timing when the sensor controlled by itself starts acquisition of information. In this embodiment, the representative sensor control part among a plurality of sensor control parts may be determined in advance or may be a determined based on a situation at that time (the number, type or the like of operating sensor control parts). Each of the sensor control parts 141-1 and 141-2 causes each of the sensors 131-1 and 131-2 to start acquisition of information when a stop notification is outputted from the magnetic field generation control part 121.

The magnetic field generation control part 121 controls generation of a magnetic field in the coil 111. Specifically, the magnetic field generation control part 121 generates a magnetic field by supplying a current or applying a voltage to the coil 111. The magnetic field generation control part 121 stops generation of the magnetic field from the coil 111 when stop of the magnetic field generation is requested from the sensor control parts 141-1 and 141-2. When the magnetic field generation control part 121 completely stops generation of the magnetic field from the coil 111, the magnetic field generation control part 121 outputs a predetermined stop notification (magnetic field completely stop notification) to the sensor control parts 141-1 and 141-2. The magnetic field generation control part 121 resumes generation of the magnetic field from the coil 111 when a finished notification is outputted from the sensor control parts 141-1 and 141-2. In this embodiment, in a case that two sensors 131-1 and 131-2 are operated, the magnetic field generation control part 121 resumes generation of the magnetic field from the coil 111 after a later timing that is one of a timing when a finished notification is outputted from the sensor control part 141-1 and a timing when a finished notification is outputted from the sensor control part 141-2. In a case that the number of the operating sensors and the number of the sensor control parts are not less than three, the magnetic field generation control part 121 resumes generation of the magnetic field from the coil 111 after a timing when the latest finished notification is outputted.

Figure 6:
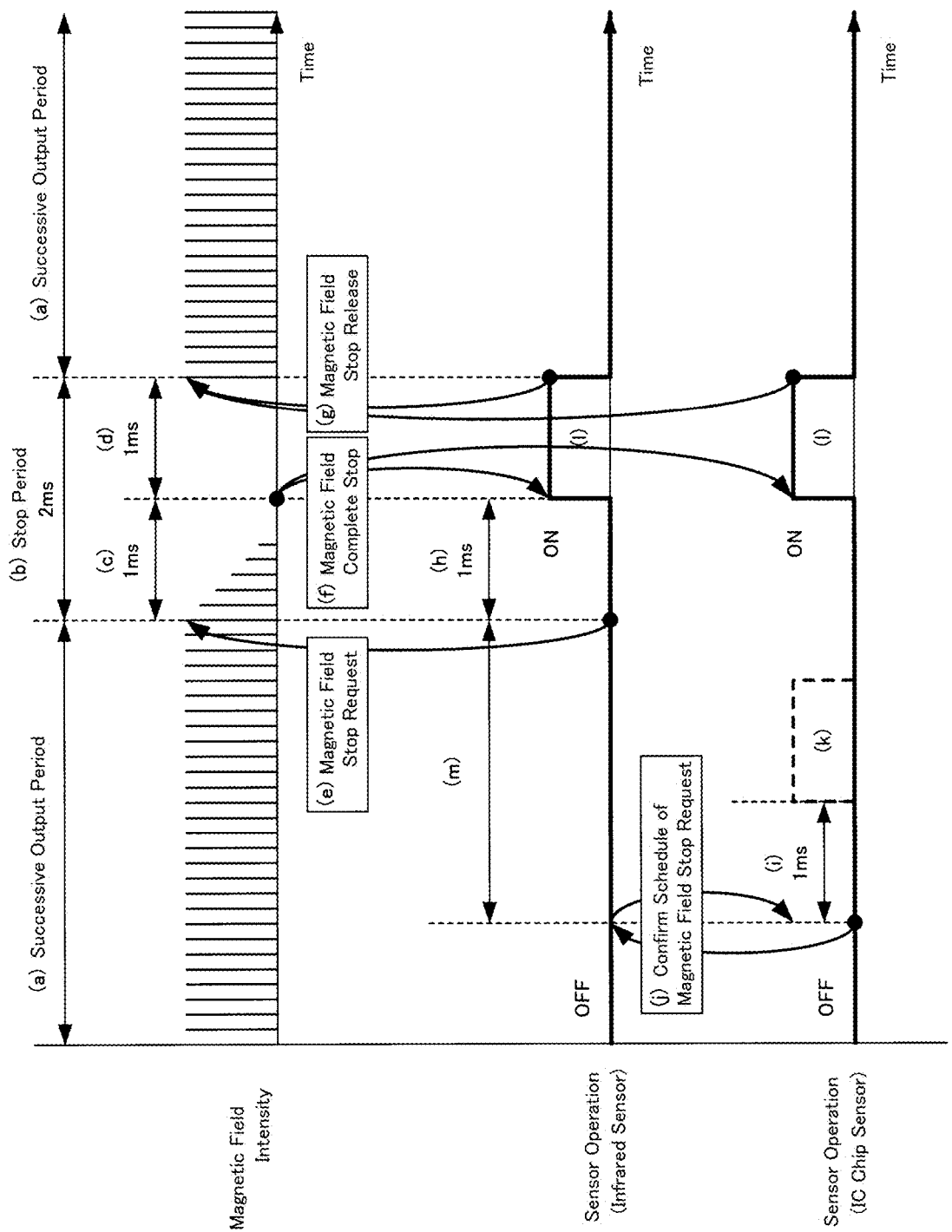
FIG. 6 is a view showing an example of a timing relationship between magnetic field generation and sensor operations in the magnetic recording medium processing apparatus shown in FIG. 5.

FIG. 6 is a view showing an example of a timing relationship between magnetic field generation and sensor operations in the magnetic recording medium processing apparatus 101 shown in FIG. 5. In this example, the sensor 131-1 is an infrared sensor, the sensor 131-2 is an IC chip sensor, and the sensor control part 141-1 controlling the sensor 131-1 is the representative sensor control part.

First, the magnetic field generation control part 121 successively generates a disturbing magnetic field from the coil 111 ("a"). The sensor control part 141-2 controlling the sensor 131-2 that is the IC chip sensor outputs a confirmation request whether or not there is a schedule which is scheduled to request stop of the magnetic field to the sensor control part 141-1 controlling the sensor 131-1 that is the infrared sensor at a timing earlier by a predetermined time period ("i": for example, 1 ms) than a start timing when the sensor 131-2 starts acquisition of information ("j"). In this case, there is a schedule of a request to stop the magnetic field and thus, the sensor control part 141-1 outputs a schedule-presence notification to the sensor control part 141-2. As a result, the sensor control part 141-2 does not operate the sensor 131-2 at a timing when the sensor 131-2 is to be originally operated ("k").

After that, a time period of ("m") has elapsed and, when a timing earlier by a predetermined time period ("h": for example, 1 ms) than a start timing when the sensor 131-1 starts acquisition of information is reached, the sensor control part 141-1 requests the magnetic field generation control part 121 to stop the magnetic field (disturbing magnetic field) generation from the coil 111 ("e"). This request may also include information indicating a request from the sensor control part 141-2.

As a result, the magnetic field generation control part 121 stops generation of the magnetic field from the coil 111. When the generation of the magnetic field from the coil 111 is completely stopped ("c" from the timing of "e": for example, 1 ms has elapsed), the magnetic field generation control part 121 outputs a stop notification (magnetic field completely stop notification) to the sensor control parts 141-1 and 141-2 ("f"). In this embodiment, a time period of "h" is not less than the time period of "c".

As a result, the respective sensor control parts 141-1 and 141-2 cause the respective sensors 131-1 and 131-2 to execute acquisition of information ("l": operating period). After that, when the sensors 131-1 and 131-2 finish the acquisition of the information, the sensor control parts 141-1 and 141-2 output finished notifications to the magnetic field generation control part 121 ("g"). The finished notification is permission or a request of the stop release of the magnetic field. The magnetic field generation control part 121 stops the generation of the magnetic field from the coil 111 for a time period from outputting the stop notification until receiving the finished notification ("d": for example, 1 ms).

In other words, the time period of "b" shown in FIG. 6: for example, 2 ms is a stop period of the magnetic field generation from the coil 111.

As a result, the magnetic field generation control part 121 resumes generation of the disturbing magnetic field from the coil 111 and successively generates the disturbing magnetic field ("a").

In this case, an operating period of information acquisition of the sensor 131-1 and an operating period of information acquisition of the sensor 131-2 are not always equal to each other. For example, in a case that an operating period of the information acquisition of the sensor 131-1 is shorter than an operating period of the information acquisition of the sensor 131-2, a timing when the sensor control part 141-2 outputs a finished notification to the magnetic field generation control part 121 becomes later than a timing when the sensor control part 141-1 outputs a finished notification to the magnetic field generation control part 121. In this case, the magnetic field generation control part 121 resumes generation of the disturbing magnetic field from the coil 111 when the finished notification is outputted from the sensor control part 141-2 whose timing is later, and the disturbing magnetic field is generated successively.

In accordance with an embodiment of the present invention, such operation may be performed in a case that a card detection switch described below is detecting a magnetic card.

Figure 7:
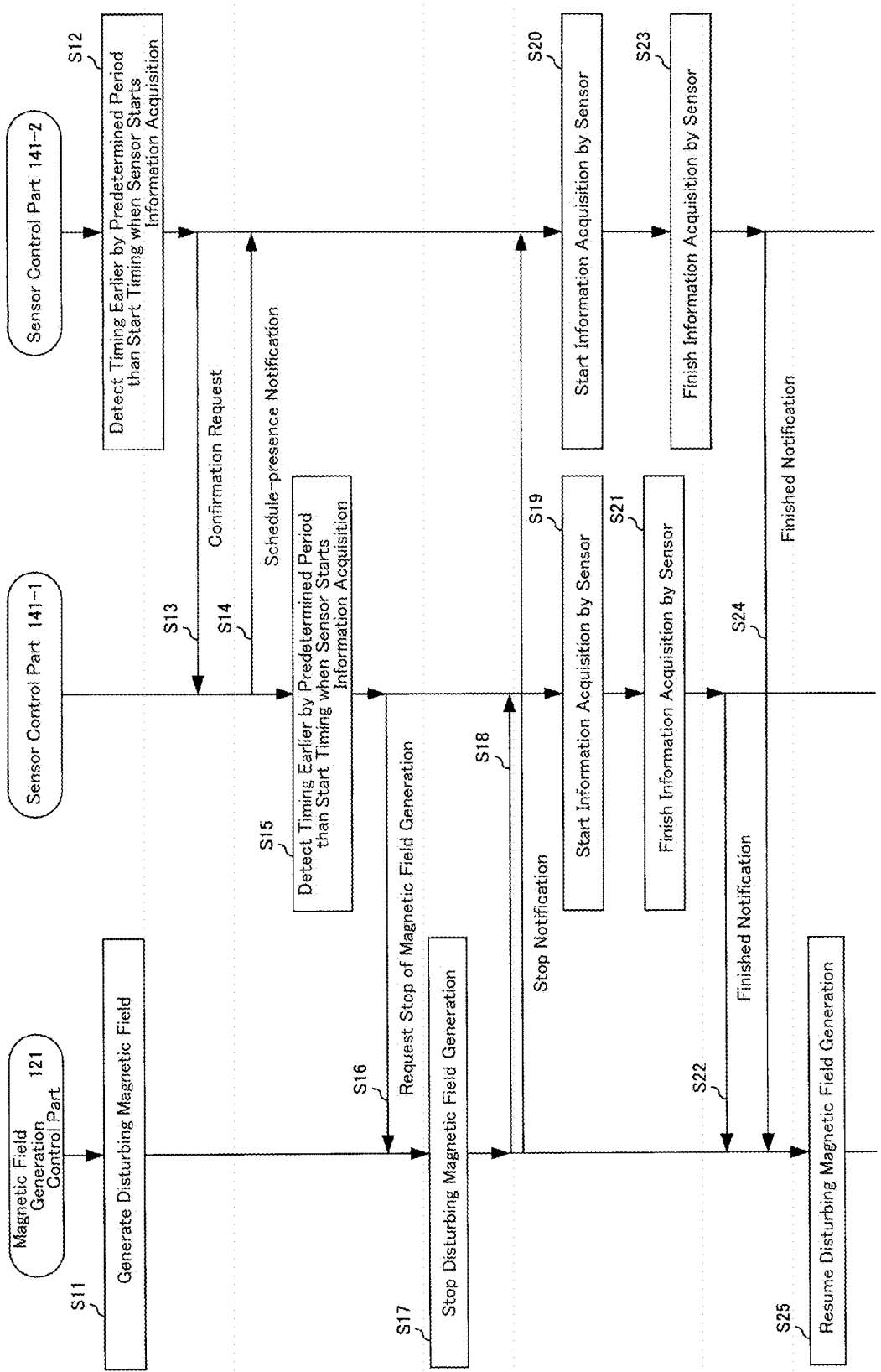
FIG. 7 is a sequence diagram for explaining an example of a magnetic field generation method in the magnetic recording medium processing apparatus shown in FIG. 5.

Next, a magnetic field generation method in the magnetic recording medium processing apparatus 101 shown in FIG. 5 will be described below. First, in a magnetic field generation method in the magnetic recording medium processing device 101 shown in FIG. 5, processing in a case that there is a schedule which is scheduled to request the sensor control part 141-1 to stop a magnetic field will be described below. FIG. 7 is a sequence diagram for explaining an example of a magnetic field generation method in the magnetic recording medium processing apparatus 101 shown in FIG. 5.

First, the magnetic field generation control part 121 generates a disturbing magnetic field from the coil 111 (step S11). On the other hand, when the sensor control part 141-2 detects a timing earlier by a predetermined time period than a start timing when the sensor 131-2 starts acquisition of information (step S12), the sensor control part 141-2 outputs a confirmation request whether there is a schedule of a request which causes the sensor control part 141-1 controlling the sensor 131-1 to stop the magnetic field or not (step S13). In this embodiment, there is a schedule that the sensor control part 141-1 requests to stop the magnetic field and thus, the sensor control part 141-1 outputs a schedule-presence notification to the sensor control part 141-2 (step S14). As a result, the sensor control part 141-2 does not operate the sensor 131-2 at a timing that is originally to be operated. The timing may be, for example, periodic timing such as a sampling period, timing when a predetermined time period has elapsed after occurrence of some event (an event is detected), or timing determined depending on a demand of a user or a function. Further, in a case that another sensor control part is provided in addition to the sensor control parts 141-1 and 141-2, the sensor control part 141-1 also outputs the schedule-presence notification to another sensor control part in the step S14. In other words, the sensor control part 141-1 outputs the schedule-presence notification to all the sensor control parts other than the sensor control part 141-1 among a plurality of the sensor control parts provided in the magnetic recording medium processing device 101.

After that, when the sensor control part 141-1 detects a timing earlier by a predetermined time period than a start timing when the sensor 131-1 starts acquisition of information (step S15), the sensor control part 141-1 requests the magnetic field generation control part 121 to stop the magnetic field (disturbing magnetic field) generation from the coil 111 (step S16). The request includes information indicating that the sensor control part 141-2 also has requested.

As a result, the magnetic field generation control part 121 stops generation of the disturbing magnetic field from the coil 111 (step S17). When the generation of the disturbing magnetic field from the coil 111 is completely stopped, the magnetic field generation control part 121 outputs a stop notification to the sensor control parts 141-1 and 141-2 (step S18).

After that, when a start timing that the sensor 131-1 starts to acquire information is reached, the sensor control part 141-1 causes the sensor 131-1 to start acquisition of information (step S19). Further, the sensor control part 141-2 causes the sensor 131-2 to start acquisition of information (step S20). The starts of the acquisition of the information by the sensors 131-1 and 131-2 may be executed by shifting states that the results detected by the sensors 131-1 and 131-2 are made ineffective to states that the results are made effective. When the sensor 131-1 finishes the acquisition of the information (step S21), the sensor control part 141-1 outputs a finished notification to the magnetic field generation control part 121 (step S22). Further, when the sensor 131-2 finishes the acquisition of the information (step S23), the sensor control part 141-2 outputs a finished notification to the magnetic field generation control part 121 (step S24). The finished notification is permission or a request of the stop release of the magnetic field. As a result, the magnetic field generation control part 121 resumes generation of the disturbing magnetic field from the coil 111 (step S25). When the finished notification is outputted from the sensor control part whose output timing of the finished notification is later, the magnetic field generation control part 121 resumes generation of the disturbing magnetic field from the coil 111 to successively generate the disturbing magnetic field. In accordance with an embodiment of the present invention, it may be configured that the magnetic field generation control part 121 receives notifications of time periods of acquiring operation of information in the sensors 131-1 and 131-2 from the sensor control parts 141-1 and 141-2 and, when the time periods (stop period) are finished, a resumption notification is outputted to the sensor control parts 141-1 and 141-2 and generation of the disturbing magnetic field from the coil 111 is autonomously resumed.

Figure 8:
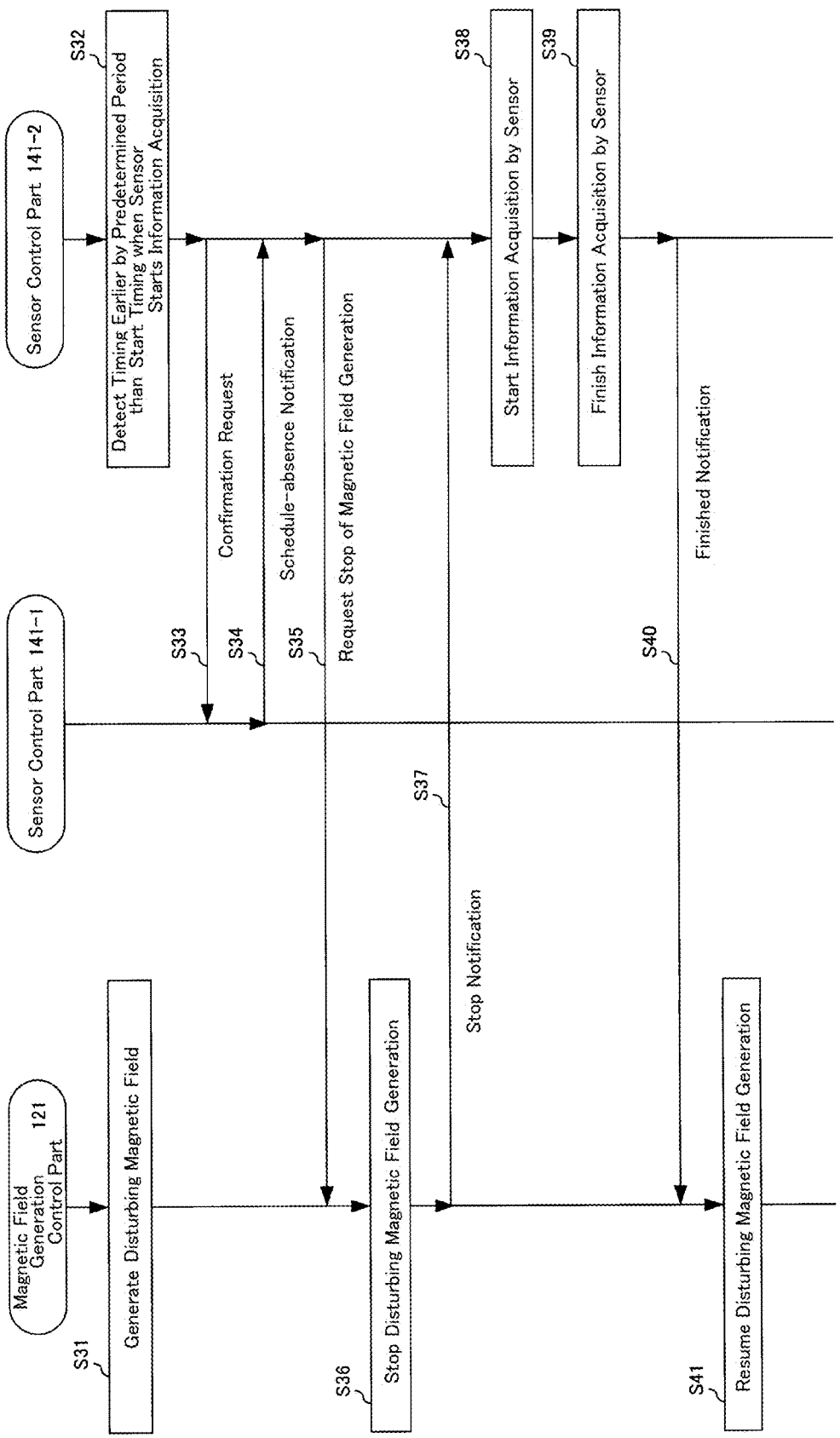
FIG. 8 is a sequence diagram for explaining another example of the magnetic field generation method in the magnetic recording medium processing apparatus shown in FIG. 5.

Next, in the magnetic field generation method in the magnetic recording medium processing device 101 shown in FIG. 5, processing in a case that the sensor control part 141-1 has no schedule of a request to stop the magnetic field will be described below. FIG. 8 is a sequence diagram for explaining another example of the magnetic field generation method in the magnetic recording medium processing apparatus 101 shown in FIG. 5.

First, the magnetic field generation control part 121 generates the disturbing magnetic field from the coil 111 (step S31). On the other hand, when the sensor control part 141-2 detects a timing earlier by a predetermined time period than a start timing when the sensor 131-2 starts acquisition of information (step S32), the sensor control part 141-2 outputs the confirmation request whether there is a schedule of a request which causes the sensor control part 141-1 controlling the sensor 131-1 to stop the magnetic field or not (step S33). In this case, there is no schedule that the sensor control part 141-1 requests to stop the magnetic field and thus, the sensor control part 141-1 outputs a schedule-absence notification to the sensor control part 141-2 (step S34). In this embodiment, in a case that other sensor control parts are provided in addition to the sensor control parts 141-1 and 141-2, the sensor control part 141-1 outputs the schedule-absence notification also to other sensor control parts in the step S34. In other words, the sensor control part 141-1 outputs the schedule-absence notification to all the sensor control parts other than the sensor control part 141-1 among a plurality of the sensor control parts provided in the magnetic recording medium processing device 101.

After that, when a timing is reached that is earlier by a predetermined time period than a start timing when the sensor 131-2 starts acquisition of information, the sensor control part 141-2 requests the magnetic field generation control part 121 to stop the magnetic field (disturbing magnetic field) generation from the coil 111 (step S35). As a result, the magnetic field generation control part 121 stops generation of the disturbing magnetic field from the coil 111 (step S36). When the generation of the disturbing magnetic field from the coil 111 is completely stopped, the magnetic field generation control part 121 outputs a stop notification to the sensor control parts 141-2 (step S37).

After that, when the start timing that the sensor 131-2 starts to acquire information is reached, the sensor control part 141-2 causes the sensor 131-1 to start acquisition of information (step S38). The start of the acquisition of the information by the sensor 131-2 may be executed by shifting a state that the result detected by the sensor 131-2 is made ineffective to a state that the result is made effective. When the sensor 131-2 finishes the acquisition of the information (step S39), the sensor control part 141-2 outputs a finished notification to the magnetic field generation control part 121 (step S40). The finished notification is permission or a request of the stop release of the magnetic field. As a result, the magnetic field generation control part 121 resumes generation of the disturbing magnetic field from the coil 111 (step S41). In accordance with an embodiment of the present invention, it may be configured that the magnetic field generation control part 121 receives a notification of a time period of acquiring operation of information in the sensor 131-2 from the sensor control part 141-2 and, when the time period (stop period) is finished, a resumption notification is outputted to the sensor control part 141-2 and generation of the disturbing magnetic field from the coil 111 is autonomously resumed.

The "stop notification", the "finished notification" and the "resumption notification" described above are sufficient that, in exchange between the magnetic field generation control part 121 and the sensor control parts 141-1 and 141-2, the notification can be recognized as a notification that generation of the disturbing magnetic field from the coil 111 is completely stopped, as a notification that the sensor 130 has finished acquisition of information, and that the magnetic field generation control part 121 resumes generation of the disturbing magnetic field from the coil 111. The format, the protocols used in the notification and the like are not limited.

In the embodiment described above, a case is described as an example that, among a plurality of sensor control parts, a representative sensor control part is determined. However, it may be configured that a representative sensor control part is not determined. In this case, a confirmation request is outputted to all sensor control parts other than itself among a plurality of the sensor control parts. When a plurality of the sensor control parts receives a confirmation request from another sensor control part other than itself, the plurality of the sensor control parts outputs a schedule-presence notification or a schedule-absence notification to all the sensor control parts other than itself. When information indicating an acquisition start timing of information by a sensor is included in the schedule-presence notification, a timing of information acquisition of the sensor accompanied with the sensor control part can be mutually recognized. Based on the timing, for example, it may be configured that the sensor control part for the sensor which is to acquire information earliest executes the processing of the steps S15 and S16.

As described above, in a case that a plurality of sensors is provided, it is confirmed between the sensors whether or not there is a schedule of a request to stop generation of a disturbing magnetic field from the coil, and a timing of stop of generation of the disturbing magnetic field from the coil is controlled so that the sensors mutually acquire information at the same timing. Therefore, stop of the disturbing magnetic field generation from the coil is suppressed as much as possible, and detection can be performed by the sensor at a necessary timing while maintaining security.

Third Embodiment

Figure 9:
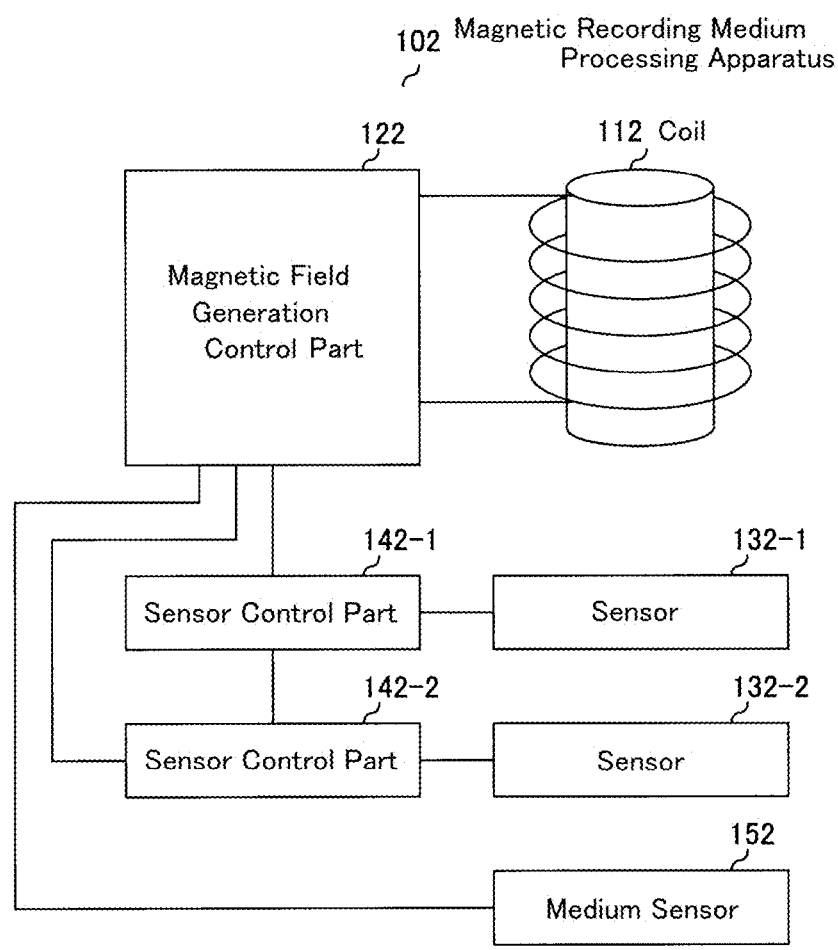
FIG. 9 is a view showing a magnetic recording medium processing apparatus in accordance with a third embodiment of the present invention.

FIG. 9 is a view showing a magnetic recording medium processing apparatus (magnetic field generation device) in accordance with a third embodiment of the present invention. A magnetic recording medium processing apparatus 102 in this embodiment includes, as shown in FIG. 9, a coil 112, a magnetic field generation control part 122, sensors 132-1 and 132-2, sensor control parts 142-1 and 142-2, and a medium sensor 152. The magnetic recording medium processing apparatus 102 is, for example, an apparatus such as a magnetic card reader, which is structured to read information recorded on a magnetic card when the magnetic card is inserted and perform predetermined processing. FIG. 9 shows an example of principal structure elements relating to this embodiment among structure elements included in the magnetic recording medium processing apparatus 102 in this embodiment.

The coil 112 is a magnetic field generation part to which a voltage is applied and thereby an electric current flows to generate a magnetic field. The coil 112 is provided at a position where magnetic noise can be applied to a skimming head, for example, in the vicinity of an insertion port for a magnetic card.

The medium sensor 152 detects that a magnetic card has been inserted into the magnetic recording medium processing device 102.

The sensors 132-1 and 132-2 execute acquisition or detection of predetermined information. The sensors 132-1 and 132-2 are, for example, an infrared sensor, an IC chip sensor or a pre-head.

The sensor control parts 142-1 and 142-2 correspond to the sensors 132-1 and 132-2 on a one-to-one basis and control execution of acquisition of information in the respective sensors 132-1 and 132-2. The sensor control part is configured so that, in a case that a schedule-presence notification is not outputted from the other sensor control part, the sensor control part outputs a confirmation request to a representative sensor control part among a plurality of sensor control parts at a timing earlier by a predetermined time period than a start timing when the sensor which is controlled by itself starts acquisition of information. The representative sensor control part is configured so that, in a case that the confirmation request is outputted from the other sensor control part, when there is a schedule which is scheduled to request the magnetic field generation control part 122 to stop magnetic field generation from the coil 112, the representative sensor control part outputs the schedule-presence notification to the other sensor control part and requests the magnetic field generation control part 122 to stop magnetic field generation from the coil 112 at a timing earlier by a predetermined time period than a start timing when the sensor controlled by itself starts acquisition of information. In a case that the confirmation request is outputted from the other sensor control part, when there is no schedule requesting the magnetic field generation control part 122 to stop magnetic field generation from the coil 112, the representative sensor control part outputs a schedule-absence notification to the other sensor control part. In a case that the schedule-absence notification is outputted from the representative sensor control part, the sensor control part other than the representative sensor control part requests the magnetic field generation control part 122 to stop magnetic field generation from the coil 112 at a timing earlier by a predetermined time period than a start timing when the sensor controlled by itself starts acquisition of information. In this embodiment, the representative sensor control part among a plurality of sensor control parts may be determined in advance or may be determined based on a situation at that time (the number, type or the like of operating sensor control parts). Each of the sensor control parts 142-1 and 142-2 causes each of the sensors 132-1 and 132-2 to start acquisition of information when a stop notification is outputted from the magnetic field generation control part 122.

The magnetic field generation control part 122 controls generation of a magnetic field in the coil 112. Specifically, the magnetic field generation control part 122 generates a magnetic field by supplying a current or applying a voltage to the coil 112. The magnetic field generation control part 122 stops generation of the magnetic field from the coil 112 when stop of magnetic field generation is requested by the sensor control parts 142-1 and 142-2. When the magnetic field generation control part 122 completely stops generation of the magnetic field from the coil 112, the magnetic field generation control part 122 outputs a predetermined stop notification to the sensor control parts 142-1 and 142-2. When the magnetic field generation control part 122 receives a finished notification outputted from the sensor control parts 142-1 and 142-2, the magnetic field generation control part 122 resumes generation of the magnetic field from the coil 112. In this case, in a case that two sensors 132-1 and 132-2 are operated, the magnetic field generation control part 122 resumes generation of the magnetic field from the coil 112 after a timing which is later of a timing when a finished notification is outputted from the sensor control part 142-1 and a timing when a finished notification is outputted from the sensor control part 142-2. In a case that the number of the operating sensors and the number of the sensor control parts are not less than three, the magnetic field generation control part 122 resumes generation of the magnetic field from the coil 112 after the latest timing when the finished notification is outputted. The magnetic field generation control part 122 is configured so that, in a case that the medium sensor 152 detects a magnetic card having been inserted, the magnetic field generation control part 122 intermittently generates the magnetic field from the coil 112 and, when generation of the magnetic field from the coil 112 is stopped in each timing when generation of the disturbing magnetic field is stopped, the magnetic field generation control part 122 outputs a stop notification to the sensor control parts 142-1 and 142-2.

Figure 10:
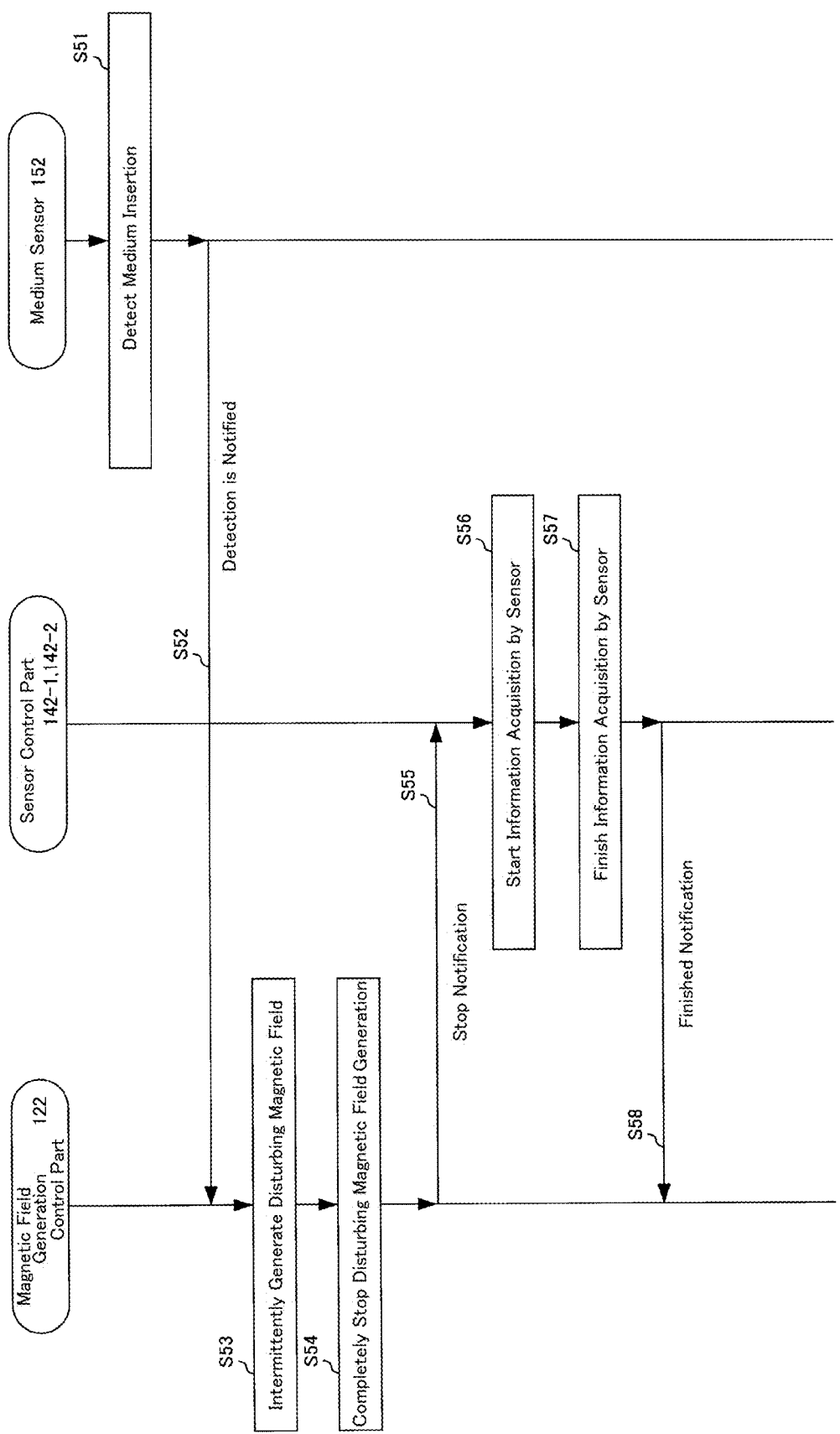
FIG. 10 is a sequence diagram for explaining an example of a magnetic field generation method in the magnetic recording medium processing apparatus shown in FIG. 9.

Next, a magnetic field generation method in the magnetic recording medium processing apparatus 102 shown in FIG. 9 will be described below. FIG. 10 is a sequence diagram for explaining an example of a magnetic field generation method in the magnetic recording medium processing apparatus 102 shown in FIG. 9.

First, when the medium sensor 152 detects insertion of a magnetic card (step S51), the medium sensor 152 notifies the insertion of the magnetic card having been detected to the magnetic field generation control part 122 (step S52). As a result, the magnetic field generation control part 122 intermittently generates a disturbing magnetic field from the coil 112 (step S53).

In each timing for stopping generation of the disturbing magnetic field, when generation of the disturbing magnetic field from the coil 112 is completely stopped (step S54), the magnetic field generation control part 122 outputs a stop notification indicating a completely stopped state to the sensor control parts 142-1 and 142-2 (step S55). Then, the sensor control parts 142-1 and 142-2 respectively start acquisition of information in the respective sensors 132-1 and 132-2 (step S56).

After that, when the acquisition of the information is finished in the respective sensors 132-1 and 132-2 (step S57), the sensor control parts 142-1 and 142-2 output finished notifications indicating that the acquisition of the information has been finished to the magnetic field generation control part 122 (step S58).

As described above, the medium sensor 152 structured to detect that a magnetic card has been inserted into an insertion port is provided and, when the medium sensor 152 detects insertion of the magnetic card, the magnetic field generation control part 122 intermittently generates a disturbing magnetic field from the coil 112 and, in each timing for stopping generation of the disturbing magnetic field, when generation of the disturbing magnetic field is completely stopped, the magnetic field generation control part 122 outputs a stop notification to the sensor control parts 142-1 and 142-2. Therefore, information of a magnetic card is acquired during a time period when generation of the disturbing magnetic field is stopped and thus, necessary information can be acquired from the magnetic card while maintaining security.

As described above, in the embodiments described above, each of the respective structure elements provides each of respective functions (processing), but the allocation is not limited to the embodiments described above. Further, the structures of the structure elements in the embodiments described above are only examples and are not limited to the above-mentioned structures. Further, the embodiments described above may be combined with each other.

What is claimed is:

1. A magnetic recording medium processing apparatus for use with a magnetic card, the apparatus comprising:
   a magnetic field generation part structured to generate a magnetic field;
   a magnetic head to read information recorded on the magnetic card inserted into the magnetic recording media processing apparatus;
   a magnetic field generation control part configured to control generation of the magnetic field in the magnetic field generation part;
   a sensor configured to execute acquisition of predetermined information, the sensor being different from the magnetic head; and
   a sensor control part configured to control execution of the acquisition of the information in the sensor;

wherein the sensor control part controls the sensor to periodically acquire the predetermined information and requests stop of magnetic field generation from the magnetic field generation part to the magnetic field generation control part at a timing earlier by a predetermined time period than a start timing when the sensor starts the acquisition of the information; and wherein the magnetic field generation control part stops the generation of the magnetic field from the magnetic field generation part when the stop of the magnetic field generation is requested from the sensor control part.

2. The magnetic recording medium processing apparatus according to claim 1, wherein the magnetic field generation control part outputs a predetermined stop notification to the sensor control part after the magnetic field generation control part stops the generation of the magnetic field from the magnetic field generation part, and the sensor control part causes the sensor to start the acquisition of the information when the stop notification is outputted from the magnetic field generation control part.

3. The magnetic recording medium processing apparatus according to claim 2, wherein the sensor comprises a plurality of the sensors, the sensor control part comprises a plurality of the sensor control parts each of which controls execution of the acquisition of the information in each of the plurality of the sensors, a sensor control part other than a first sensor control part in the plurality of the sensor control parts outputs a confirmation request confirming a schedule which is scheduled to request the stop to the first sensor control part at the timing earlier by the predetermined time period than the start timing when the sensor controlled by the sensor control part starts the acquisition of the information, in a case that the confirmation request is outputted from the sensor control part other than the first sensor control part, the first sensor control part outputs a schedule-presence notification to the sensor control part other than the first sensor control part when there is the schedule requesting the magnetic field generation control part to stop the magnetic field generation from the magnetic field generation part, and the sensor control part which has outputted the confirmation request is configured so that, in a case that the schedule-presence notification indicating the schedule requesting the stop is outputted from the first sensor control part, the sensor control part causes the sensor to start the acquisition of the information after the stop notification is outputted from the magnetic field generation control part.

4. The magnetic recording medium processing apparatus according to claim 3, wherein the first sensor control part is configured so that, in a case that the confirmation request is outputted from the sensor control part other than the first sensor control part, when there is no schedule requesting the magnetic field generation control part to stop the magnetic field generation from the magnetic field generation part, the first sensor control part outputs a schedule-absence notification indicating that there is no schedule requesting to stop the magnetic field generation to the sensor control part other than the first sensor control part, and the sensor control part which has outputted the confirmation request is configured so that, after the confirmation request has been outputted, in a case that the schedule-absence notification is outputted from the first sensor control part, the sensor control part requests the magnetic field generation control part to stop the magnetic field generation from the magnetic field generation part.

5. The magnetic recording medium processing apparatus according to claim 3, wherein each of the plurality of the sensor control parts outputs a predetermined finished notification to the magnetic field generation control part when each of the plurality of the sensors finishes the acquisition of the information, and the magnetic field generation control part resumes the generation of the magnetic field from the magnetic field generation part after a latest finished notification is outputted among the finished notifications outputted from the plurality of the sensor control parts.

6. The magnetic recording medium processing apparatus according to claim 3, further comprising a medium sensor structured to detect that a medium on which information is recorded by using magnetism has been inserted into the magnetic recording medium processing apparatus, wherein in a case that the medium sensor detects that the medium has been inserted, the magnetic field generation control part intermittently generates the magnetic field from the magnetic field generation part and, when the generation of the magnetic field from the magnetic field generation part is stopped, the stop notification is outputted to the plurality of the sensor control parts.

7. The magnetic recording medium processing apparatus according to claim 2, wherein the sensor control part outputs a predetermined finished notification to the magnetic field generation control part when the sensor finishes the acquisition of the information, and the magnetic field generation control part resumes the generation of the magnetic field from the magnetic field generation part when the finished notification is outputted from the sensor control part.

8. The magnetic recording medium processing apparatus according to claim 7, wherein the sensor comprises a plurality of the sensors, the sensor control part comprises a plurality of the sensor control parts each of which controls execution of the acquisition of the information in each of the plurality of the sensors, a sensor control part other than a first sensor control part in the plurality of the sensor control parts outputs a confirmation request confirming a schedule which is scheduled to request the stop to the first sensor control part at the timing earlier by the predetermined time period than the start timing when the sensor controlled by the sensor control part starts the acquisition of the information, in a case that the confirmation request is outputted from the sensor control part other than the first sensor control part, the first sensor control part outputs a schedule-presence notification to the sensor control part other than the first sensor control part when there is the schedule requesting the magnetic field generation control part to stop the magnetic field generation from the magnetic field generation part, and the sensor control part which has outputted the confirmation request is configured so that, in a case that the schedule-presence notification indicating the schedule requesting the stop is outputted from the first sensor control part, the sensor control part causes the sensor to start the acquisition of the information after the stop notification is outputted from the magnetic field generation control part.

9. The magnetic recording medium processing apparatus according to claim 8, wherein
the first sensor control part is configured so that, in a case that the confirmation request is outputted from the sensor control part other than the first sensor control part, when there is no schedule requesting the magnetic field generation control part to stop the magnetic field generation from the magnetic field generation part, the first sensor control part outputs a schedule-absence notification indicating that there is no schedule requesting to stop the magnetic field generation to the sensor control part other than the first sensor control part, and
the sensor control part which has outputted the confirmation request is configured so that, after the confirmation request has been outputted, in a case that the schedule-absence notification is outputted from the first sensor control part, the sensor control part requests the magnetic field generation control part to stop the magnetic field generation from the magnetic field generation part.

10. The magnetic recording medium processing apparatus according to claim 9, wherein
each of the plurality of the sensor control parts outputs a predetermined finished notification to the magnetic field generation control part when each of the plurality of the sensors finishes the acquisition of the information, and
the magnetic field generation control part resumes the generation of the magnetic field from the magnetic field generation part after a latest finished notification is outputted among the finished notifications outputted from the plurality of the sensor control parts.

11. The magnetic recording medium processing apparatus according to claim 10, further comprising a medium sensor structured to detect that a medium on which information is recorded by using magnetism has been inserted into the magnetic recording medium processing apparatus,
wherein in a case that the medium sensor detects that the medium has been inserted, the magnetic field generation control part intermittently generates the magnetic field from the magnetic field generation part and, when the generation of the magnetic field from the magnetic field generation part is stopped, the stop notification is outputted to the plurality of the sensor control parts.

12. The magnetic recording medium processing apparatus according to claim 11, wherein the magnetic field generation control part is configured so that, when a designated stop time period is finished, the magnetic field generation control part outputs a resumption notification indicating that the designated stop time period is finished to the sensor control part to resume the generation of the magnetic field from the magnetic field generation part.

13. The magnetic recording medium processing apparatus according to claim 1, wherein
the sensor control part outputs a predetermined finished notification to the magnetic field generation control part when the sensor finishes the acquisition of the information, and
the magnetic field generation control part resumes the generation of the magnetic field from the magnetic field generation part when the finished notification is outputted from the sensor control part.

14. The magnetic recording medium processing apparatus according to claim 1, wherein the magnetic field generation control part is configured so that, when a designated stop time period is finished, the magnetic field generation control part outputs a resumption notification indicating that the designated stop time period is finished to the sensor control part to resume the generation of the magnetic field from the magnetic field generation part.

15. A magnetic field generation method for use with a magnetic card, the method comprising:
processing which generates a magnetic field from a coil;
processing which reads information recorded from the magnetic card inserted into a magnetic recording medium processing apparatus;
processing in which a sensor periodically acquires predetermined information different from information recorded on the magnetic card;
processing in which a sensor control part controlling the sensor requests a magnetic field generation control part which controls magnetic field generation of the coil to stop the magnetic field generation from the coil at a timing earlier by a predetermined time period than a start timing when the sensor starts acquisition of the information; and
processing in which the magnetic field generation control part stops generation of the magnetic field from the coil when stop of the magnetic field generation is requested.

16. The magnetic field generation method according to claim 15, further comprising:
processing in which a predetermined stop notification is outputted to the sensor control part when the magnetic field generation control part stops the generation of the magnetic field from the coil, and
processing in which the sensor control part causes the sensor to start the acquisition of the information when the stop notification is outputted.

17. The magnetic field generation method according to claim 16, further comprising:
processing in which, when the sensor finishes the acquisition of the information, the sensor control part outputs a predetermined finished notification to the magnetic field generation control part, and
processing in which, when the finished notification is outputted, the magnetic field generation control part resumes the generation of the magnetic field from the coil.

18. The magnetic field generation method according to claim 15, further comprising:
processing in which, when the sensor finishes the acquisition of the information, the sensor control part outputs a predetermined finished notification to the magnetic field generation control part, and
processing in which, when the finished notification is outputted, the magnetic field generation control part resumes the generation of the magnetic field from the coil.

* * * * *